Figure 1:
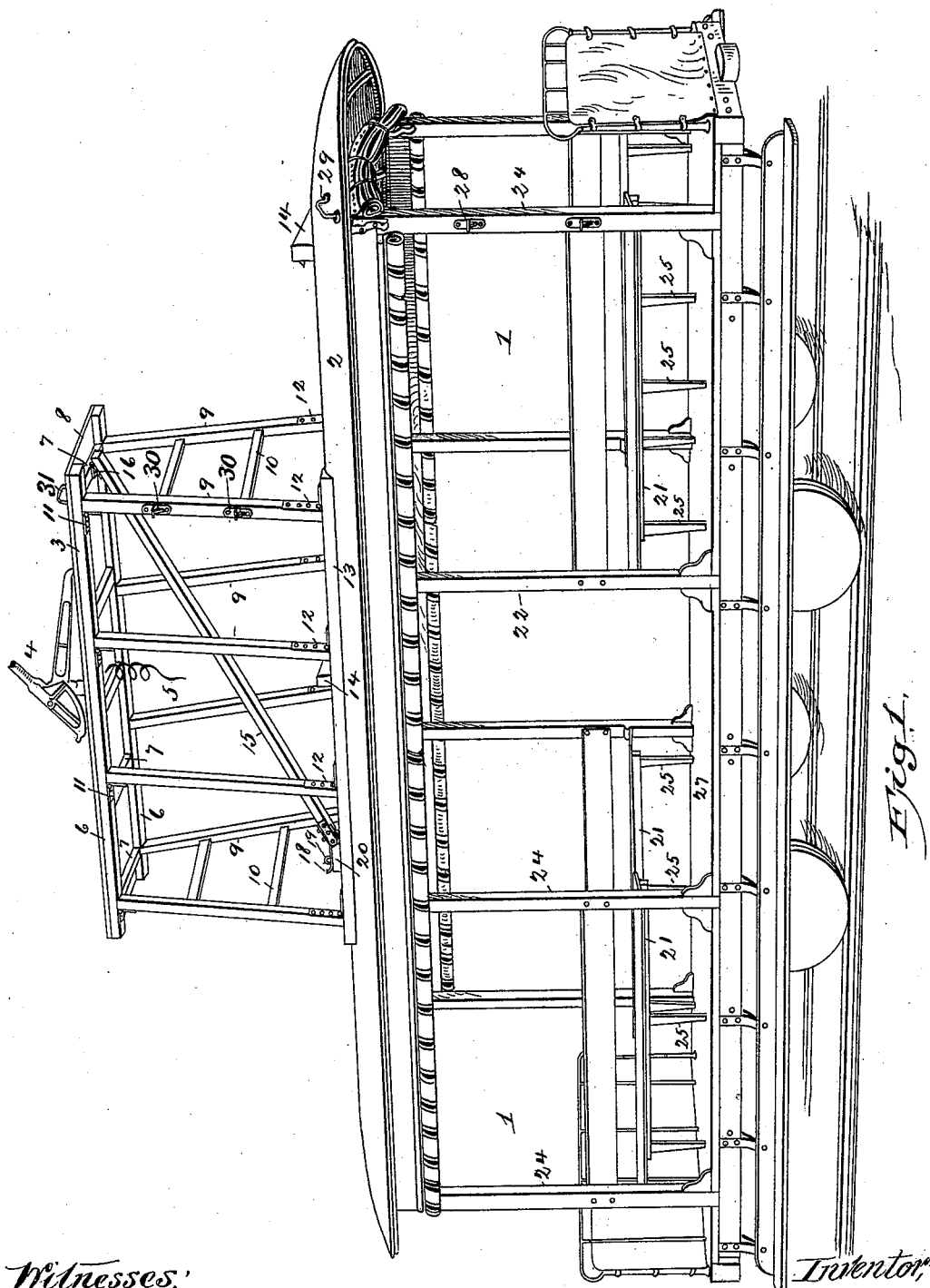

(No Model.)  H. J. LYCETT.  3 Sheets—Sheet 1.
TROLLEY CAR.

No. 522,224.  Patented July 3, 1894.

Witnesses:
C. W. Benjamin
B. S. Wree

Inventor,
Herbert J. Lycett
By Joseph L. Levy
atty.

(No Model.)  3 Sheets—Sheet 2.
H. J. LYCETT.
TROLLEY CAR.
No. 522,224. Patented July 3, 1894.
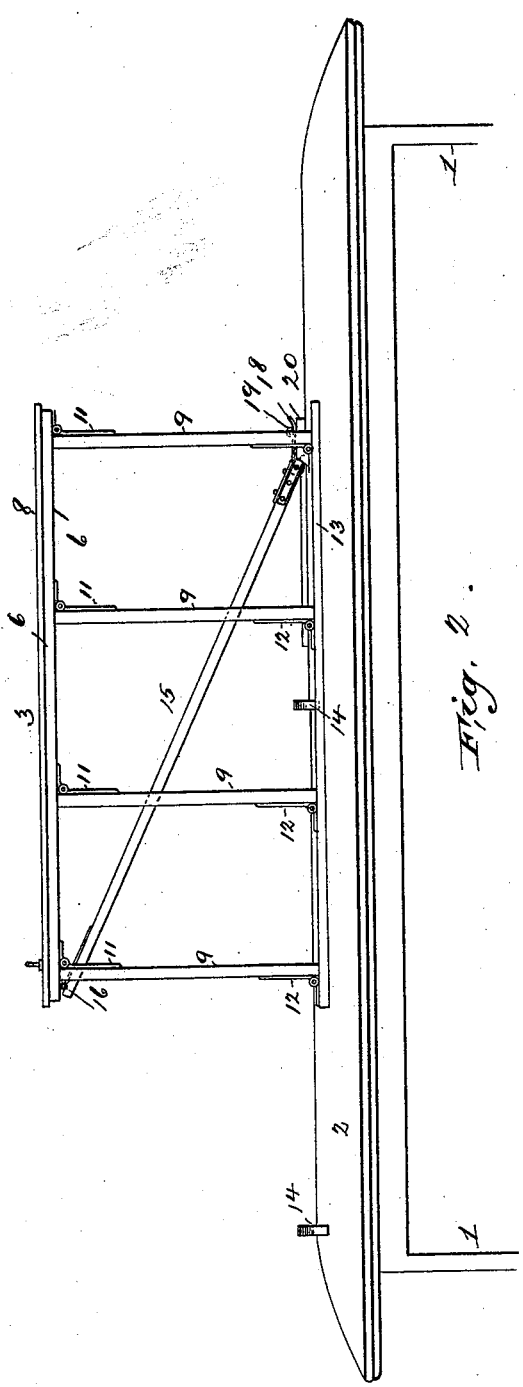
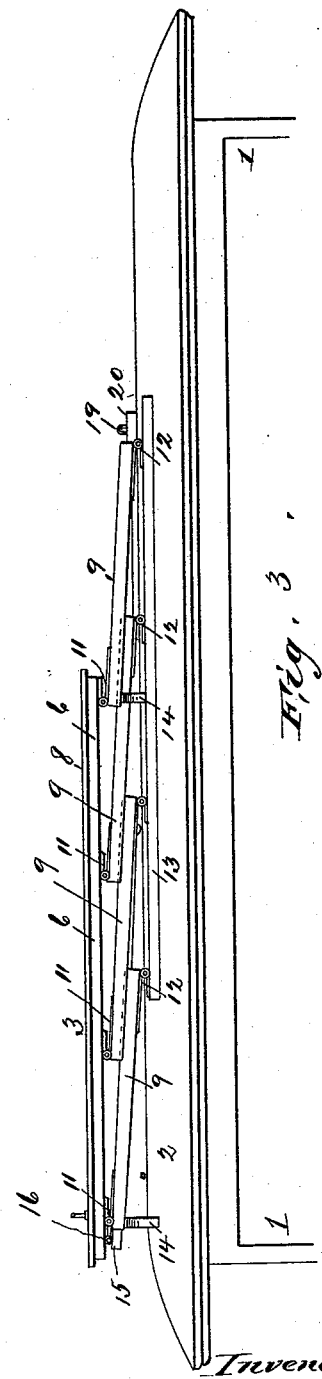
Attest,
C. W. Benjamin.
B. S. Wise.
Inventor
Herbert J. Lycett.
By Joseph L. Levy
atty (No Model.) 3 Sheets—Sheet 3.
H. J. LYCETT.
TROLLEY CAR.
No. 522,224. Patented July 3, 1894.
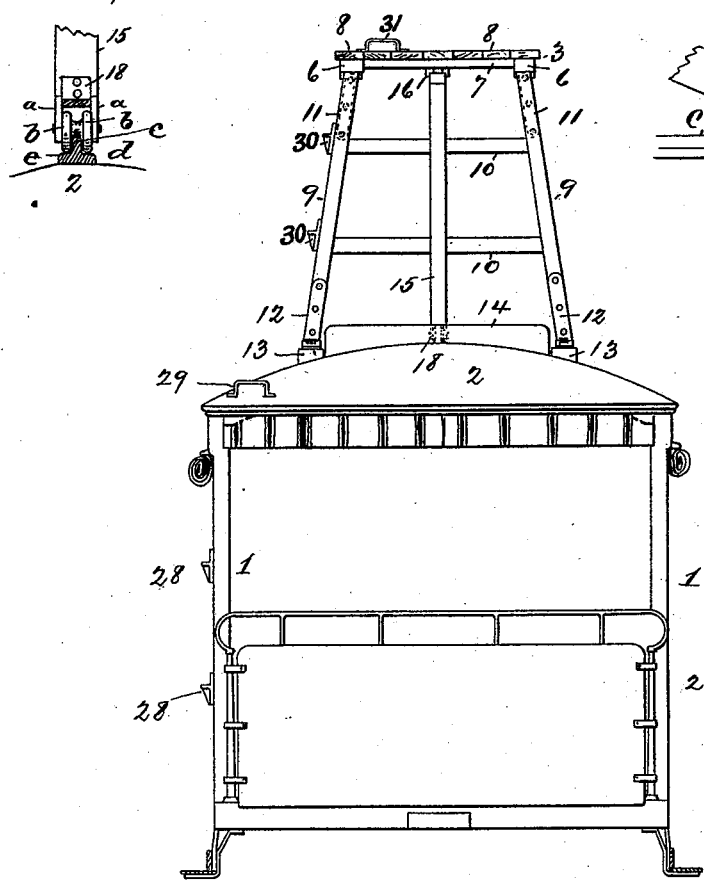
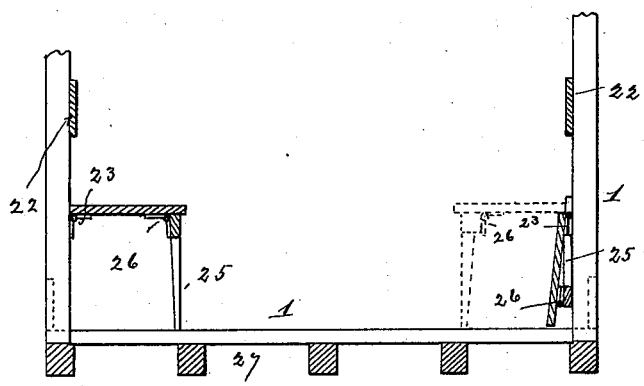
attest,
C. W. Benjamin.
B. S. Wise
Inventor,
Herbert J. Lycett,
By 
atty

UNITED STATES PATENT OFFICE.

HERBERT J. LYCETT, OF BRYN MAWR, ASSIGNOR TO JOHN A. BRILL, OF PHILADELPHIA, PENNSYLVANIA.

TROLLEY-CAR.

SPECIFICATION forming part of Letters Patent No. 522,224, dated July 3, 1894.

Application filed November 9, 1893. Serial No. 490,465. (No model.)

*To all whom it may concern:*

Be it known that I, HERBERT J. LYCETT, a citizen of the United States, residing at Bryn Mawr, in the county of Montgomery and State of Pennsylvania, have made certain new and useful Improvements in Trolley-Cars, of which the following is a specification.

My invention is more particularly designed to permit a car that is capable of use for carrying passengers to be also used as a constructor car or for assistance in repairing the lines of feed wires or conductors of trolley systems and their supports and connections.

The invention therefore consists in the combination with a car, carrying on its top or roof a platform or support that may be elevated to support workmen while repairing the overhead conductors, of the hereinafter described means for supporting the platform in its elevated or lowered positions; and further in the combination with such a platform of a trolley pole or arm and an extensible or flexible conductor leading to a suitable motor in the car for propelling the same and permitting the platform to be raised or lowered, without disturbing the electrical connection.

The invention also consists in the novel details of improvement and the combinations of parts that will be more fully hereinafter set forth and then pointed out in the claims.

Reference is to be had to the accompanying drawings forming part hereof, wherein—

Figure 1 is a perspective view of a car having my improvements applied, the platform or support on top of the car being in the elevated position. Fig. 2 is a detail side view of the roof of the car and the elevated platform, looking from the side of the car opposite to that shown in Fig. 1. Fig. 3 is a corresponding view showing the platform lowered or folded down on the car roof. Fig. 4 is an end view of the car shown in Fig. 1. Fig. 5 is a detail cross sectional view of the lower part of the car showing the folding seats. Fig. 6 is a side elevation of a portion of the platform sustaining means, and Fig. 7 is a front elevation partly in section of the same without the abutment block.

In the accompanying drawings, in which corresponding numerals indicate like parts in the several views, 1 indicates a car which may be of suitable construction and provided with suitable running gear and a motor (not shown) which may be arranged in any preferred manner.

2 is the roof of the car upon which my collapsible or elevating platform or support 3 may be carried. Upon the platform or support 3 may be placed and preferably carried a trolley pole or arm 4 of suitable construction, and a conductor 5 leading therefrom to the motor in the usual or desired manner.

The conductor 5 should be sufficiently long and flexible to permit proper elevating of the pole 4 when the platform 3 is raised, and when properly connected with the motor a device results whereby the line workman can get close to the feed system for repairs, &c., and also move the car by power from the same line.

The platform 3 may be made in any desired manner, being shown composed of a frame having longitudinal beams 6 connected by cross braces 7 and covered by boards or a flooring 8.

The platform 3 is shown supported on the car roof 2 by posts or uprights 9, preferably diverging as shown, that are adapted to fold down upon, or close to, the roof, whereby a collapsible tower is produced. The posts or supports 9, 9 are shown arranged in pairs, certain pairs of which posts may be united by cross braces 10. At their upper ends the posts or uprights 9 are hinged or pivoted to the platform or to its beams 6, and at their lower ends said posts are shown hinged or pivotally carried upon the car roof 2. Suitable hinges 11 are shown connecting the beams 6 with the posts 9, and corresponding hinges 12 connect the posts 9 with the roof 2 or with sills or beams 13 carried thereby, which sills, when used, brace and strengthen the parts.

It will be noticed that the hinges 11 and 12 face or project in opposite directions, so that the posts can fold down upon the roof 2 and beneath the platform 3 (see Fig. 3). To compensate for any curve or other outline of the car roof 2 I have shown the latter provided with cross bars or ribs 14 having flat tops, upon which the posts 9 may rest when the parts are folded down (see Fig. 3) whereby the folding structure is held in proper position upon the car roof and the platform 3 retained in proper relative position with the roof.

In order to permit the posts 9 to lie as close to the car roof as possible I have recessed them as shown in dotted lines Fig. 3, the bottom portion of each post lying within the extremes of the top of the adjacent posts while overlapping as shown. This is made necessary by the difference in the distance between the top and bottom of the posts when divergently disposed as shown.

To sustain the platform 3 in the proper position when it is elevated, I provide a brace or bar 15 that may extend diagonally from the car roof 2 to the platform 3 (see Fig. 1). This brace or bar 15 is shown pivoted by a suitable hinge 16 to the platform 3 or to a cross bar 7 thereof, and at its opposite end said brace is adjustably connected with the roof 2. For the latter purpose I have shown a projecting spring plate 18 at the end of said brace 15 engaging a raised loop 19 on an abutment block 20 carried by the roof 2. The plate 18 may be made of spring metal, and a pin may pass through the eye or loop 19 to hold the plate 18 in place. The end of the brace 15 may abut or rest against the block 20 to assist in bracing the platform 3 and posts 9. By the above arrangement the brace 15 is held from movement in either direction and the platform 3 is strongly braced, but it is evident that the brace 15 may be held in any suitable manner and any desired kind of brace may be used.

The end of the brace rod 15 is provided with guiding and anti friction devices as follows: In plates $a$ (Figs. 6, and 7) are oppositely journaled two disks or rollers $b$ which project from the brace rod 15 and which engage the vertical sides of a web $c$ formed on a guide block $d$, the rollers resting upon the horizontal portion $e$ of the block. The guide block is preferably as long as the amount of longitudinal movement of the brace 15 and is carried on the car roof extending longitudinally thereof. By this means as the platform 3 is raised and lowered the brace 15 will be properly guided on the roof 2 and will thus be brought into proper engagement with the abutment 20, so that its spring plate 18 can engage the loop 19, and without danger of displacement of the brace.

While the elevating platform or support 3 may be used on any desired construction of car I find it desirable in some cases to utilize the car for carrying tools and repairing and line building materials, while also permitting the use of the car for carrying passengers, when desired. For this purpose I have shown the car 1 provided with adjustable or movable seats 21 that extend longitudinally of the car, and are capable of folding back against the side or wall 22 of the car (see Fig. 5). By this means a wide central open space is provided in the car for use in carrying implements, &c. The seat 21 is shown pivotally carried by the wall 22 by hinges 23. In Fig. 1 I have shown an open car, to the uprights 24 of which the seats 21 are hinged, but of course any suitable construction of car body or frame may be used to support the seats 21. The seats 21 are shown provided with legs or supports 25 that are pivotally carried by said seats by hinges 26, and said legs are adapted to rest on the floor 27 of the car, as at the left in Fig. 5, to support the seat in a horizontal position, and to fold back against the seat when the latter is lowered, and to extend between the vertical side posts of the car as at the right in Fig. 5, where they may be held by any suitable means. The hinges 23 are preferably so located and arranged that the seats 21 may drop or fold down when not in use, as in Fig. 5.

In ordinary use the platform or support 3 may be kept lowered or folded as in Fig. 3, whereby the car can travel without interference. When it is desired to arrange or repair the overhead conductors or fixtures along the line of track the car can be run to the desired location and then the platform or support 3 can be raised or elevated and the brace 15 adjusted in the holding position, as in Figs. 1, 2 and 4, whereupon the operators or linemen can mount or stand upon said platform to do the required work. When they have finished at one point the car can be moved along to the next point without lowering the platform, which is permitted by the trolley pole 4, being carried on the platform 3. Also the platform or support 3 can be lowered and the car is ready to proceed along the route as usual. Steps or cleats 28 may be secured on the side or upright 24 of the car and a handhold or loop 29 may be placed on the roof 2 by which the operators can climb to the car roof. On the posts or supports 9 are also placed steps 30 and on the platform 3 a handhold 31 to permit the operator to climb up upon the platform 3.

It will be understood that the construction and arrangement of the parts shown may be changed and modified without departing from the spirit of my invention.

Having now described my invention, what I claim is—

1. A car having a platform or support upon its roof, which platform is arranged to be raised and lowered, combined with a trolley pole or arm carried by said platform, and a wire or conductor connecting with said trolley pole or arm, said wire or conductor being extensible or flexible to permit the raising of the platform, substantially as described.

2. A car having a roof, combined with a platform or support upon said roof, hinged or movable supports on the roof for the platform, whereby said platform can be raised or lowered, and inflexible means secured to said platform and having a movable connection with the car roof for holding the platform in its raised position, substantially as described.

3. A car having a platform or support upon its roof, which platform is arranged to be raised and lowered, combined with a brace extending from said platform to the car roof to hold the platform in the raised position, said brace having movable connection with said roof substantially as described.

4. A car having a movable platform upon its roof, supports for sustaining said platform in the raised position, and means independent of the supports and carried by the platform for holding said platform in the latter position, substantially as described.

5. A car having a roof combined with supports hinged to or on the upper side of said roof, a platform carried by said supports, a brace other than the supports pivoted to said platform and arranged to extend diagonally from said platform to said roof, and means for securing said brace at its free end to said roof top, substantially as described.

6. A car having a roof cleats 13 on said roof, supports 9 hinged to said cleats, and a platform also hinged to said supports combined with means for holding said supports upright, and the cross bar or bars 14 for maintaining the platform parallel with the roof when lowered, substantially as described.

7. A car and supports hinged to its roof, combined with a platform hinged to said supports, a brace pivotally connected with said platform, a plate on said brace, an abutment 20 on said roof, and means for holding said plate upon said abutment, substantially as described.

8. A car and supports hinged to its roof, combined with a platform pivotally carried by said supports, a brace connected with said platform, a spring plate connected with said brace, and means for connecting said plate with the car roof, substantially as described.

9. The combination of a car with a collapsible platform carried thereby, a brace extending from said platform, a friction roller carried by said brace, an abutment to receive said brace, and means for holding said brace, substantially as described.

10. The combination of a car and its roof with a collapsible platform carried on said roof, a brace connected with said platform, a roller carried by said brace, a guide block for said roller, and means for holding said brace, substantially as described.

11. The combination of a car and its roof with a collapsible platform carried thereby, a brace connected with said platform, a pair of rollers carried by said brace, a guide block having a web to receive said rollers, and means for holding said brace, substantially as described.

Signed at Philadelphia, in the county of Philadelphia and State of Pennsylvania, this 30th day of October, 1893.

HERBERT J. LYCETT.

Witnesses:
J. C. MARR,
HENRY C. ESLING.